US005906798A

United States Patent [19]

Schuelke et al.

[11] Patent Number: 5,906,798

[45] Date of Patent: May 25, 1999

[54] SEGMENTED CERAMIC ELECTRODE STATION

[75] Inventors: Gregory W. Schuelke, Hubertus; Richard R. Hammen, Menomonee Falls, both of Wis.

[73] Assignee: Enercon Industries Corporation, Menomonee Falls, Wis.

[21] Appl. No.: 08/683,394

[22] Filed: Jul. 18, 1996

Related U.S. Application Data

[60] Provisional application No. 60/001,375, Jul. 24, 1995.

[51] Int. Cl.[6] ........ B01J 19/12

[52] U.S. Cl. ........ 422/186.05

[58] Field of Search ........ 422/186.05

[56] References Cited

U.S. PATENT DOCUMENTS

| | | | |
|---|---|---|---|
| 3,409,537 | 11/1968 | Cannon | 422/186.05 |
| 4,153,560 | 5/1979 | Dinter et al. | 250/531 |
| 4,446,110 | 5/1984 | Ahlbrandt | 422/186.05 |
| 4,533,523 | 8/1985 | Ahlbrandt | 422/186.05 |
| 4,556,554 | 12/1985 | Ahlbrandt | 422/186.04 |
| 4,575,329 | 3/1986 | Ahlbrandt | 425/174 |
| 4,724,507 | 2/1988 | Ahlbrandt | 361/225 |
| 4,774,061 | 9/1988 | Ahlbrandt | 422/186.05 |
| 4,777,557 | 10/1988 | Ahlbrandt | 361/225 |

*Primary Examiner*—Daniel J. Jenkins

*Attorney, Agent, or Firm*—Quarles & Brady, LLP

[57] ABSTRACT

A corona treatment apparatus has a rotating roller electrode and a stationary electrode assembly for treating material passing over the roller electrode. The stationary electrode assembly includes an electrode support that extends along the roller electrode and is spaced therefrom. A one-piece dielectric element is positioned between the electrode support and the roller electrode with the material to be treated passing therebetween. A plurality of conductive electrode elements are separately movable into a first position in contact with the one-piece dielectric element to produce a corona that treats material passing over the roller electrode. A separate over-the-center spring mechanism is provided to hold each conductive electrode element in the first, treatment position, or in a second, withdrawn position in which no corona is produced.

18 Claims, 4 Drawing Sheets

SEGMENTED CERAMIC ELECTRODE STATION

This application claims the benefit of U.S. Provisional Application No. 60/001,375, filed Jul. 24, 1995.

BACKGROUND OF THE INVENTION

The field of the invention is corona treatment stations, and particularly, the construction of electrodes for such stations.

Corona treatment stations for sheets, or webs of plastic materials take many forms. Typically, the material to be treated is fed through a treatment zone in which one surface of the material is bombarded with ions produced by a high voltage alternating electric field. The material is supported in the treatment zone by a conductive roller which also serves as one electrode for the corona treater. A second, active electrode is supported in the treatment zone and is spaced from the conductive roller equidistantly along its length. For many years the active electrode has taken the form of metal segments pivotally attached to a bar or beam, so as to be selectively swung away from the roller for removal from the treatment zone. In this manner, the width of the treatment zone can be adjusted to accommodate webs of different width.

One difficulty is that such segmented electrodes produce an uneven treatment. This may be caused either by an uneven spacing of the segments from the roller electrode or by changes in the electric field strength at the junction of adjacent segments.

Treatment station reliability has been significantly increased recently by employing an elongated active electrode having a coating, or jacket, made of a heat resistant insulating material. Such a structure is disclosed in U.S. Pat. No. 4,446,110 entitled Treating the Surface of Articles by Electrical Brush Discharge, where the active electrode is constructed from a hollow quartz rod which is filled with a conductive material and which extends the entire length of the roller electrode. While such constructions provide relatively uniform treatment, the width of the treatment zone is fixed by the length of the active electrode.

A number of attempts have been made to provide a segmented active electrode in which each segment is covered with an insulating jacket. Characteristically, such structures have employed a metal bar or beam which extends along the length of the roller electrode and which supports a series of metal fingers that each extend from the beam toward the roller electrode. In this respect they are very similar to the well known segmented metal electrodes in that the separate metal fingers can be removed or swung away to adjust the width of the treatment zone. The difference is that a jacket of insulating material is slipped over the end of each metal finder to allow bare roll treating. The uneven treatment produced by segmented active electrodes is greatly amplified when the segments are insulated in this manner, and such constructions thus far have not been commercially successful.

U.S. Pat. No. 4,575,379 entitled Electrode Element For Corona Treater describes another approach to providing an insulated active electrode which is segmented to allow alteration of the treatment zone. Individual insulated segments are mounted to a track and selectively connected to a conductive electrode. Uneven treatment is reduced by angling the ends of each insulated segment. While the uniformity of treatment is improved with this construction, it is still uneven and the individually shaped segments are costly to manufacture.

SUMMARY OF THE INVENTION

The present invention relates to an insulated active electrode for a corona treatment station which is segmented for altering the width of the treatment zone. The insulated active electrode is supported along the length of a roller electrode, spaced equidistantly therefrom. The insulated active electrode includes a dielectric element, which extends the width of the corona treatment region, and conductive electrode assembly formed by a plurality of separately engagable electrode elements mounted adjacent the dielectric element. The separate electrode elements are engaged for treatment by moving them into contact with the back surface of the dielectric element. The size, position and number of corona treatment zones is determined by selectively engaging the appropriate electrode elements.

A general object of the invention is to provide a segmented, insulated electrode which produces uniform corona treatment. This is achieved by providing a one-piece dielectric element, rather than segmenting the dielectric. Only the conductive elements of the active electrode are segmented and separately engagable to control the width and location of the corona treatment zone.

DESCRIPTION OF THE PREFERRED EMBODIMENT

Figure 1:
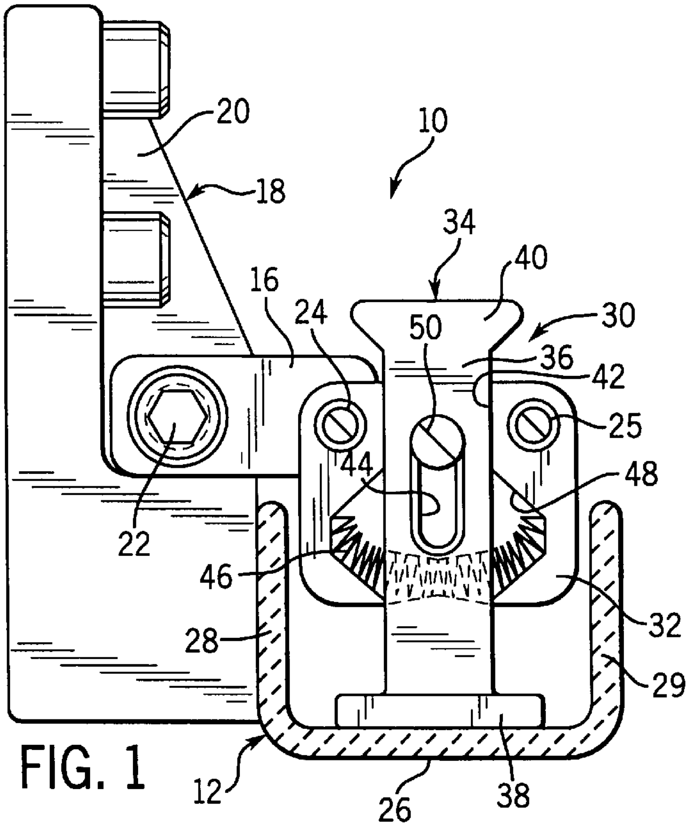
FIG. 1 is a view in cross section taken through a preferred embodiment of an insulated active electrode according to the present invention.
Figure 3:
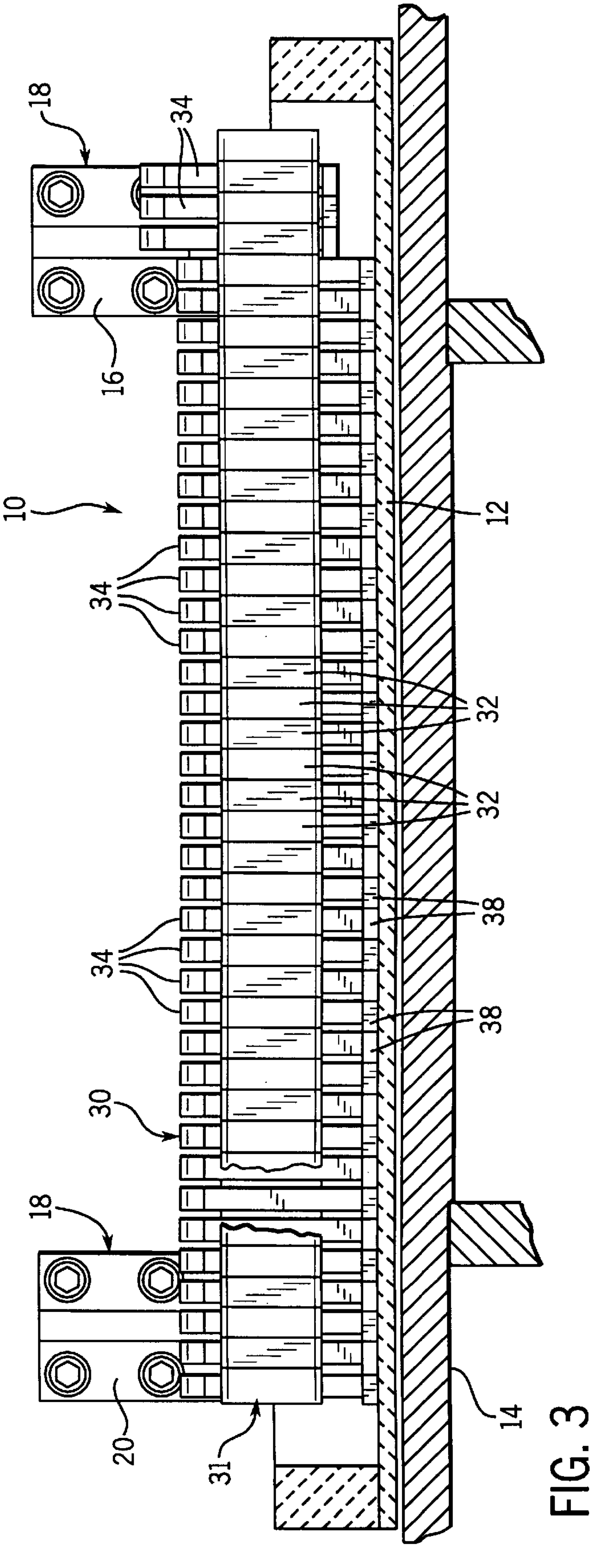
FIG. 3 is a side elevation view of the insulated active electrode of FIG. 1.

Referring particularly to FIGS. 1 and 3, an insulated active electrode 10 extends across the entire width of the corona treater and is supported in a position away from the surface of roller electrode 14 by mounts 18. Although two mounts 18 are illustrated attaching the active electrode 10 to the corona treater, a greater number may be provided as determined by the width of the corona treater. Each mount 18 includes a bracket 20 to which an arm 16 of electrically insulating material is fastened by bolt 22.

The active electrode 10 includes a one-piece dielectric element 12 having a U-shape that defines an active discharge portion 26 between two legs 28 and 29 which extend upward. One leg 28 is attached to each bracket 20 which hold the dielectric element 12 in position along the length of the roller electrode 14 at the desired spacing. The one-piece dielectric element 12 and the arms 16 preferably are made from ceramic materials. The ceramic used for the dielectric element 12 may be the same as that used in the prior art corona treatment stations referred to above, and the ceramic used for the arms 16 is selected for its machinability.

The active electrode 10 also includes a conductive electrode assembly 30 extending along the length of the roller electrode 14 and fastened to arms 16 by a rod 24. The electrode assembly 30, which is connected to a source of high voltage, is comprised of a plurality of electrode segments 32 held abutting one another by rods 24 and 25. Each electrode segment 32 supports one of the separately engagable electrode elements 34, with forty such electrode elements 34 shown in the exemplary active electrode 30 in FIG. 3. Each one-piece electrode element 34 includes a stem 36 with a plate 38 at an end proximate to the dielectric element 12 and a knob 40 at the remote end. The stem 36 extends downward through a channel 42 in a major surface of the electrode segment 32 and has slot 44 through which a bolt 50 passes to slidingly hold the electrode element 34 in the channel 42. The stem 36 has a transverse notch in which a spring 46 is disposed with the ends of the spring being received in a cavity 48 of the channel 42 in the electrode segment 32. In the engaged position illustrated in FIG. 1, the spring 46 biases associated electrode element 34 so that its metallic plate 38 is forced against the interior surface of the discharge portion 26 of the one-piece dielectric element 12. In this engaged position of the electrode elements 34, the spring bias force ensures tight engagement with the dielectric element 12 so that arching will not occur at the interface.

Figure 2:
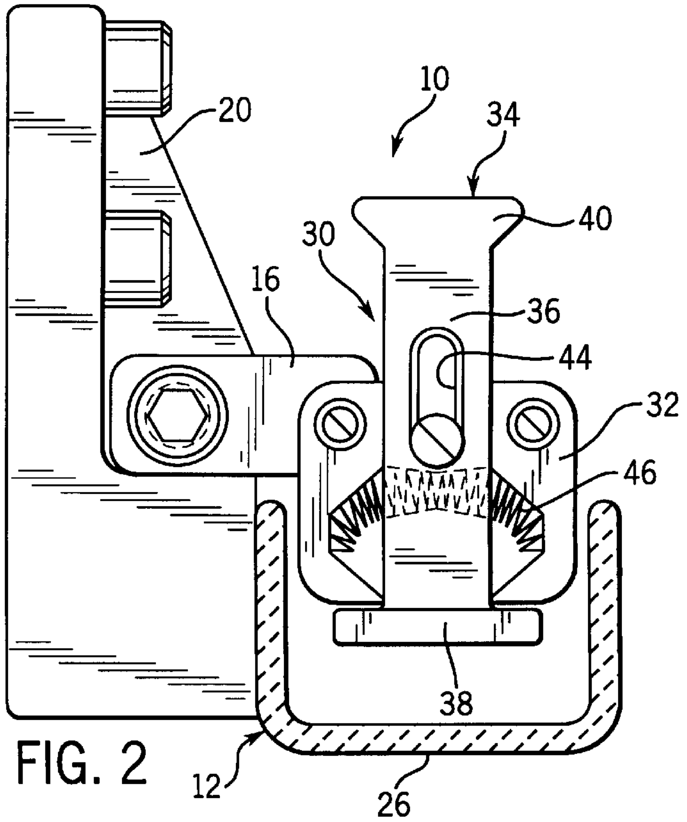
FIG. 2 is a view of the insulated active electrode in a raised state.

Each electrode element 34 may be selectively disengaged to control the location and width of corona treatment. Disengagement is accomplished by grasping the knob 40 and pulling the plate 38 away from the discharge portion 26 of one-piece dielectric element 12, against the bias force of spring 46. The spring 46 has two stable positions shown in FIGS. 1 and 2. As the plate 38 is pulled away from the engaged position in FIG. 1, the spring 46 snaps into the FIG. 2 orientation and holds the electrode element 32 in the disengaged position. In this disengaged position, the metallic plate 38 is spaced far enough away from the roller electrode 14 that no corona is produced therebetween.

Figure 4:
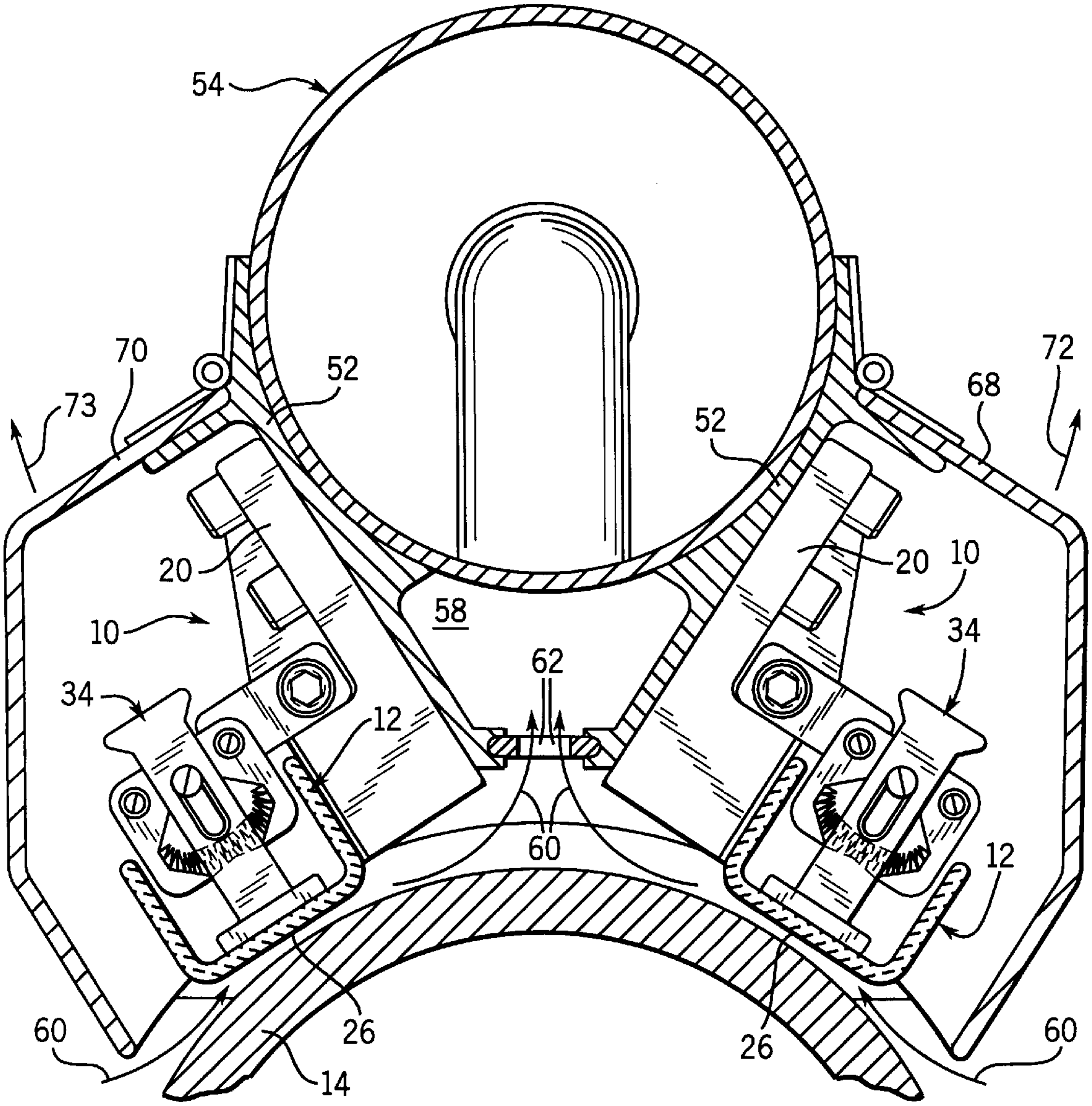
FIG. 4 is a cross-sectional view of a corona treatment station which uses a pair of insulated active electrodes shown in FIG. 1.
Figure 5:
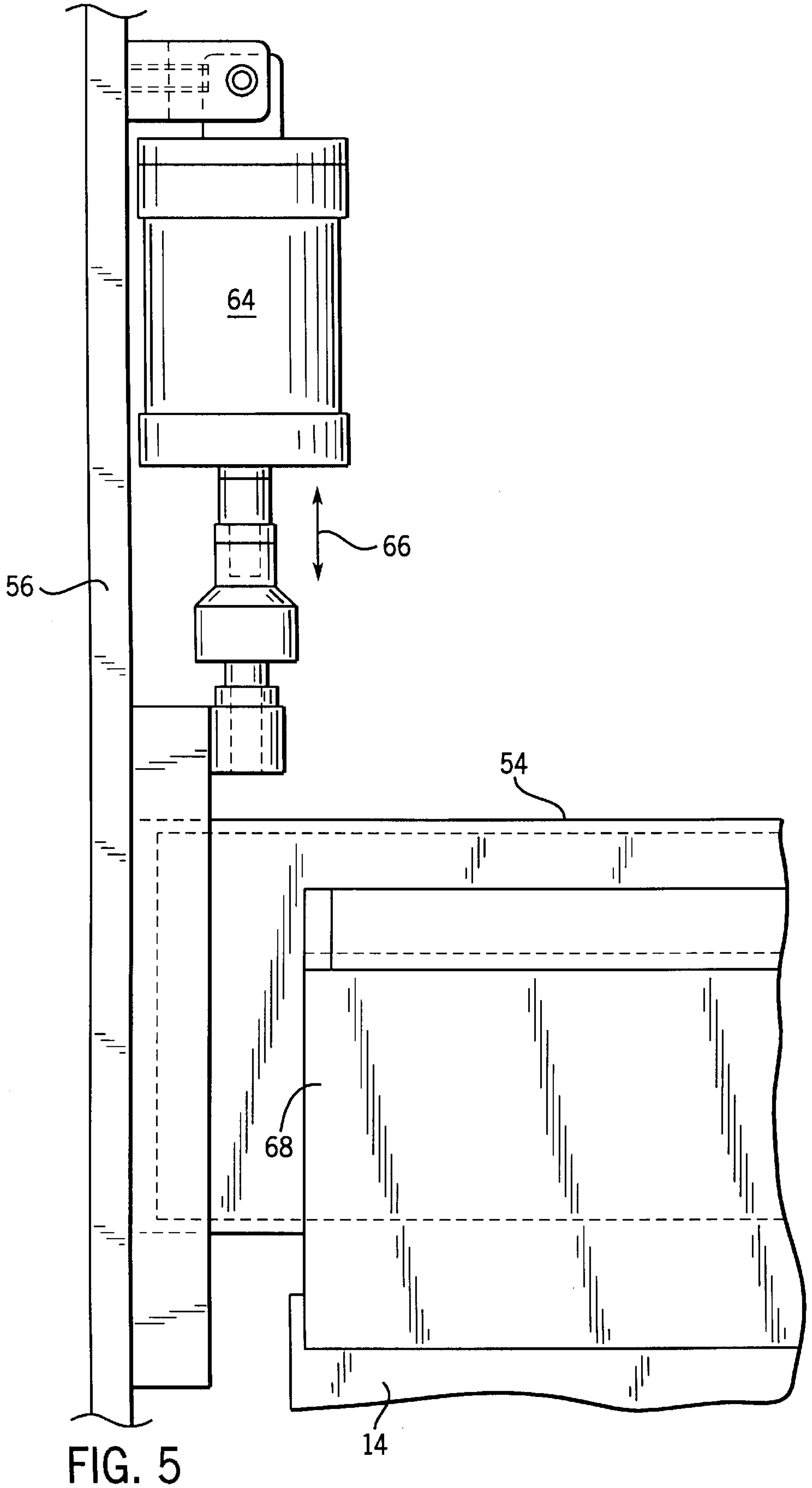
FIG. 5 is a partial side elevation view of an end of the corona treatment station of FIG. 4.

Referring particularly to FIGS. 4 and 5, the brackets 20 support a pair of insulated active electrodes 10 on two side members 52 of a header 54. The header 54 is supported at each of its ends to the corona treater frame 56. The header 54 includes an exhaust duct 58 connected to a fan (not shown in the drawings) which draws cooling air into the header through openings 62 disposed along the exhaust duct adjacent the roller electrode 14. Cooling air is thus drawn across the surface of the active discharge portion 26 of each adjacent one-piece dielectric element 12 and into the exhaust duct 58 through the openings 62. This air flow, indicated by arrows 60, cools the discharge surfaces of the active electrodes 10 and improves the quality of the corona discharge.

As shown in FIG. 5, a linear actuator 64 mounts each end of the header 54 to the corona treater frame 56, and the actuators 64 are operated to control the spacing between the insulated active electrodes 10 and the roller electrode 14. As indicated by arrow 66, the linear actuator 64 may be operated to translate the header 54 and attached active electrodes away from the roller electrode 14. This facilitates the threading of the web to be treated over the surface of the roller electrode 14. The linear actuators 64 are then operated to translate the header 54 back to its operating position in which the one-piece dielectric elements 12 are spaced a proper distance from the roller electrode 14 to obtain the desired treatment of the web passing therebetween.

Referring again to both FIGS. 4 and 5, hinged doors 68 and 70 are fastened along the top edge of each side member 52 of the header 54. During the operation of the corona treater, these doors 68 and 70 extend downward over the respective insulated active electrodes 10 to shield the high voltage elements therein from accidental contact. When the corona treater is turned off, the hinged doors 68 and 70 can be swung upward as indicated by arrows 72 and 73 to allow easy access to the insulated active electrodes 10. The operator may then selectively engage and disengage individual electrode elements 34 as described above to provide the desired treatment pattern.

We claim:

1. In a corona treatment apparatus having a first electrode over which material to be treated is passed, a second electrode, and a power supply for providing a source of high voltage across said first and second electrodes, the second electrode comprising:

an electrode support extending along the first electrode and spaced therefrom;

a one-piece dielectric element between the electrode support and the first electrode; and a plurality of conductive electrode elements supported by the electrode support wherein each conductive electrode element is separately movable into a first position in contact with the one-piece dielectric element and into a second position spaced from the one-piece dielectric element.

2. The corona treatment apparatus recited in claim 1 in which each electrode element is part of an electrode segment having an over-the-center spring mechanism which engages the conductive electrode element to hold the conductive electrode element in the first and second positions.

3. The corona treatment apparatus as recited in claim 1 wherein the electrode support comprises a plurality of electrode segments abutting one another, and each electrode segment contains a conductive electrode element.

4. The corona treatment apparatus as recited in claim 3 wherein each electrode segment has an aperture within which said conductive electrode element is movably received.

5. The corona treatment apparatus as recited in claim 3 wherein each electrode segment has a channel therein within which channel said conductive electrode element is movably received.

6. The corona treatment apparatus as recited in claim 5 in which each electrode segment includes a spring which engages said conductive electrode element to hold said conductive electrode element in the first and second positions.

7. The corona treatment apparatus as recited in claim 1 wherein each of the plurality of conductive electrode elements has a plate at one end which abuts the one-piece dielectric element in the first position.

8. The corona treatment apparatus as recited in claim 1 wherein the one-piece dielectric element has a U-shape with a discharge portion facing the first electrode and a pair of spaced legs extending away from the first electrode, wherein the plurality of conductive electrode elements extend between the two legs and engage the discharge portion when moved to their first position.

9. A corona treatment apparatus comprising:

a roller electrode which is rotatably mounted on the corona treatment apparatus;

a header extending along the length of the roller electrode and spaced therefrom;

first and second active electrodes connected to the header and extending along the length of the roller electrode, wherein each of the first and second active electrodes includes:

(a) an electrode support;

(b) a one-piece dielectric element positioned between the electrode support and the roller electrode to present a discharge surface facing the roller electrode;

a plurality of conductive electrode elements supported by the electrode support, wherein each conductive electrode element is separately movable into a first position in contact with the one-piece dielectric element and into a second position spaced from the one-piece dielectric element; and a power supply connected to the roller electrode and said active electrodes to produce a corona between the roller electrode and those conductive electrode elements moved to their first position.

10. The corona treatment apparatus as recited in claim 9 further comprising an over-the-center spring mechanism which engages the conductive electrode elements to hold the conductive electrode elements in their first and second positions.

11. The corona treatment apparatus as recited in claim 9 wherein the electrode support includes a plurality of segments abutting one another and each segment contains one of said conductive electrode elements.

12. The corona treatment apparatus as recited in claim 9 wherein each segment has an aperture within which said conductive electrode element is movably received.

13. The corona treatment apparatus as recited in claim 12 wherein each segment has a channel therein within which said conductive electrode element is movably received.

14. The corona treatment apparatus as recited in claim 13 wherein each segment includes a spring that holds said one conductive electrode element in the first and second positions.

15. The corona treatment apparatus as recited in claim 9 wherein each of the plurality of conductive electrode elements has a plate which abuts the one-piece dielectric element in the first position.

16. The corona treatment apparatus as recited in claim 9 wherein the one-piece dielectric element has a U-shape forming a trough into which the plurality of conductive electrode elements extend.

17. The corona treatment apparatus as recited in claim 9 wherein the header forms an exhaust duct located between the first and second active electrodes and extending along the length of the roller electrode, and having an opening through which air flows after passing through the corona produced between the active electrodes and the roller electrode.

18. The corona treatment apparatus as recited in claim 9 further comprising an actuator for moving the header in a radial direction with respect to the roller electrode to enable material to be treated to be threaded between the roller electrode and said active electrodes.

* * * * *